A. T. De PUY.
Printers' Galley.
No. 6,327. Reissued March 9, 1875.
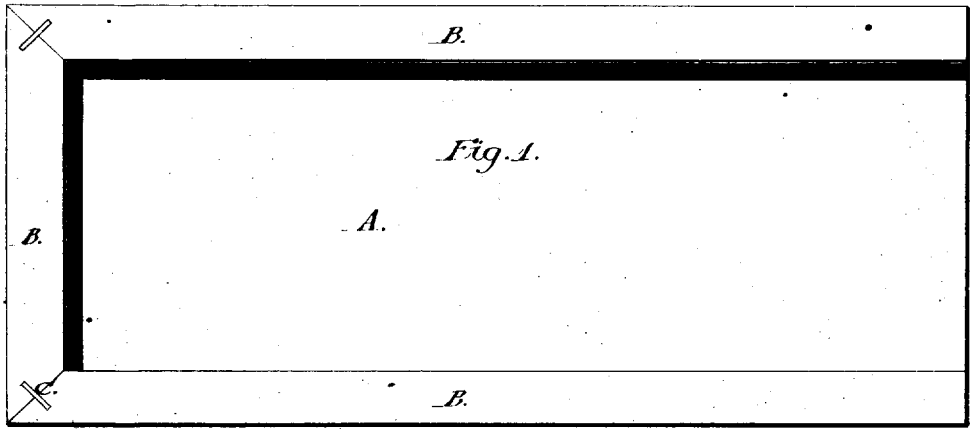
Fig. 2.
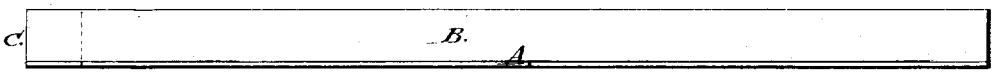
Fig. 4.
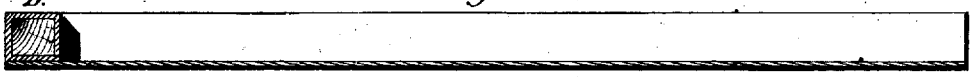
Fig. 3.
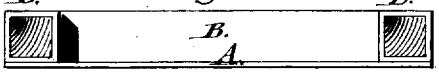
Fig. 5.
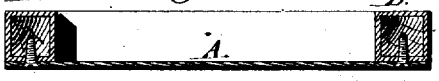
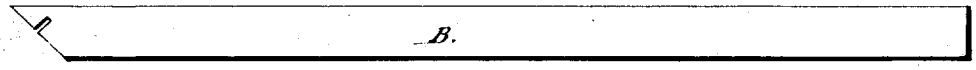
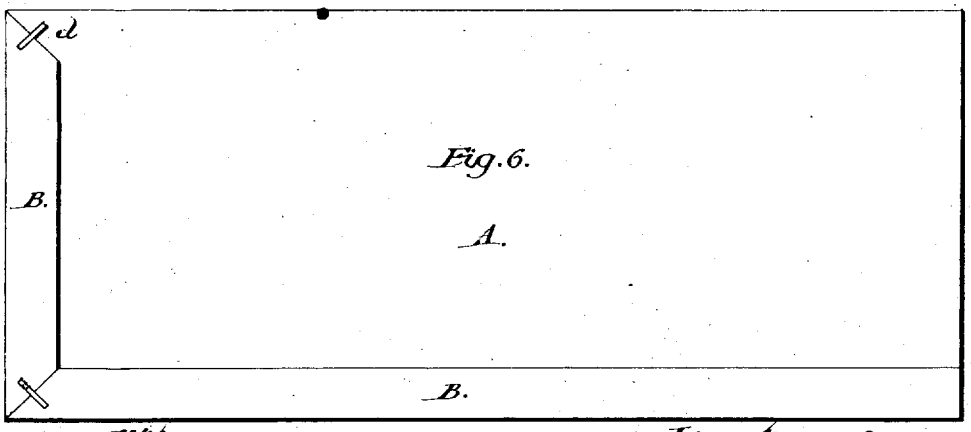
Witnesses:
Chas. H. Carpenter
N. Walter Anthony
Inventor:
Alexander T. De Puy.
R. Hoe & Co. Assignees.
THE GRAPHIC CO. PHOTO-LITH. 39 & 41 PARK PLACE, N.Y.

UNITED STATES PATENT OFFICE.

ALEXANDER T. DE PUY, OF NEW YORK, N. Y., ASSIGNOR TO R. HOE & CO., OF SAME PLACE.

IMPROVEMENT IN PRINTERS' GALLEYS.

Specification forming part of Letters Patent No. 93,422, dated August 10, 1869; reissue No. 6,327, dated March 9, 1875; application filed February 25, 1875.

CASE B.

*To all whom it may concern:*

Be it known that ALEXANDER T. DE PUY, of the city, county, and State of New York, did invent certain Improvements in Printers' Galleys, of which the following is a specification:

In the accompanying drawings, Figure 1 is a top view; Fig. 2, a side elevation; Fig. 3, an end elevation; Fig. 4, a longitudinal section; Fig. 5, a transverse section; and Fig. 6, a top view, with one side rail removed to show the means for securing its corner end.

My invention consists of a printer's galley so constructed that it shall have and retain a smooth, even surface, so as to lie evenly on the press-bed or imposing-stone for the purpose of taking proof, and which, when type are washed thereon, will not swell, warp, or become uneven in consequence of being wet with lye or other mixtures, and this I accomplish by attaching to the base-plate of the galley a hollow brass tube, so as to form ledges or rails on three sides of a parallelogram; and my invention further consists in constructing the ledge or rail of a brass or other metal tube filled with wood, metal, or a composition which will afford a secure holding-base for the screws, which protrude through the base-plate into said core, all of which will be more specifically hereinafter set forth.

The base-plate A of the galley is made of brass or other metal. B B are hollow brass or other metal tubes, having at least two adjacent sides—as *a* and *b*—at right angles to each other, which are cut to proper lengths, with their ends mitered to form the junctions at the corners at the head of the galley. These tubes, which form the edge rail of the galley, have their mitered ends, where they meet to form the corners, firmly joined together by soldering, and, in order to render such union strong and substantial, angle-braces *d*, which are flat plates of metal equal in length to the depth of the rail, are inserted in vertical slots formed in the mitered ends of the tubular rail or rib, at right angles to the line of junction, which plates are secured in position by solder. This edge rail or rib may be attached to the bed or base plate by soldering or by screws, and its ends at the foot of the galley may be closed by a metal plate soldered in position.

In order to render the tubular rail or rib solid and strong, and, at the same time, provide a material which shall securely and firmly hold the screws which fasten the rail to the base-plate, as shown in Fig. 5, the said tubular rail is filled with a close-fitting wooden core, D D, as shown in Figs. 4 and 5, or with metal, or with a composition suitable to the purpose.

Experience has taught that in a printer's galley composed of a metallic base-plate, surmounted by wooden ribs, even when they have an inside facing of brass, the wood, on being wet with lye or other mixtures, becomes swollen, warped, and twisted out of shape, and the fastening-screws employed become loose and protruded, so as to render taking of proof difficult, and sometimes impossible.

These defects are remedied by this invention, and a galley is provided which, while it is cheaply constructed, presents an entire exterior metallic surface.

The tubes forming the rail or rib may, of course, be made of any suitable metal, and it is practical not to close the ends of the said rail by a metal plate in all cases.

What we claim as of the invention of the said ALEXANDER T. DE PUY is—

1. A printer's galley constructed with an edge rail or ledge, formed from a tubular metallic rod secured to the base-plate, substantially as described.

2. A printer's galley constructed with a tubular metallic edge rail, ledge, or rib, having a wooden or equivalent core or filling, which provides a suitable bed or bearing for the threads of the screws which secure it to the base-plate, substantially as described.

3. In combination with the mitered ends of the tubular edge rail or rib, the angle-braces or ties for uniting the corners, substantially as described.

R. HOE & CO.

Witnesses:
CHAS. W. CARPENTER,
N. WALTER ANTHONY.